Patented Nov. 4, 1930

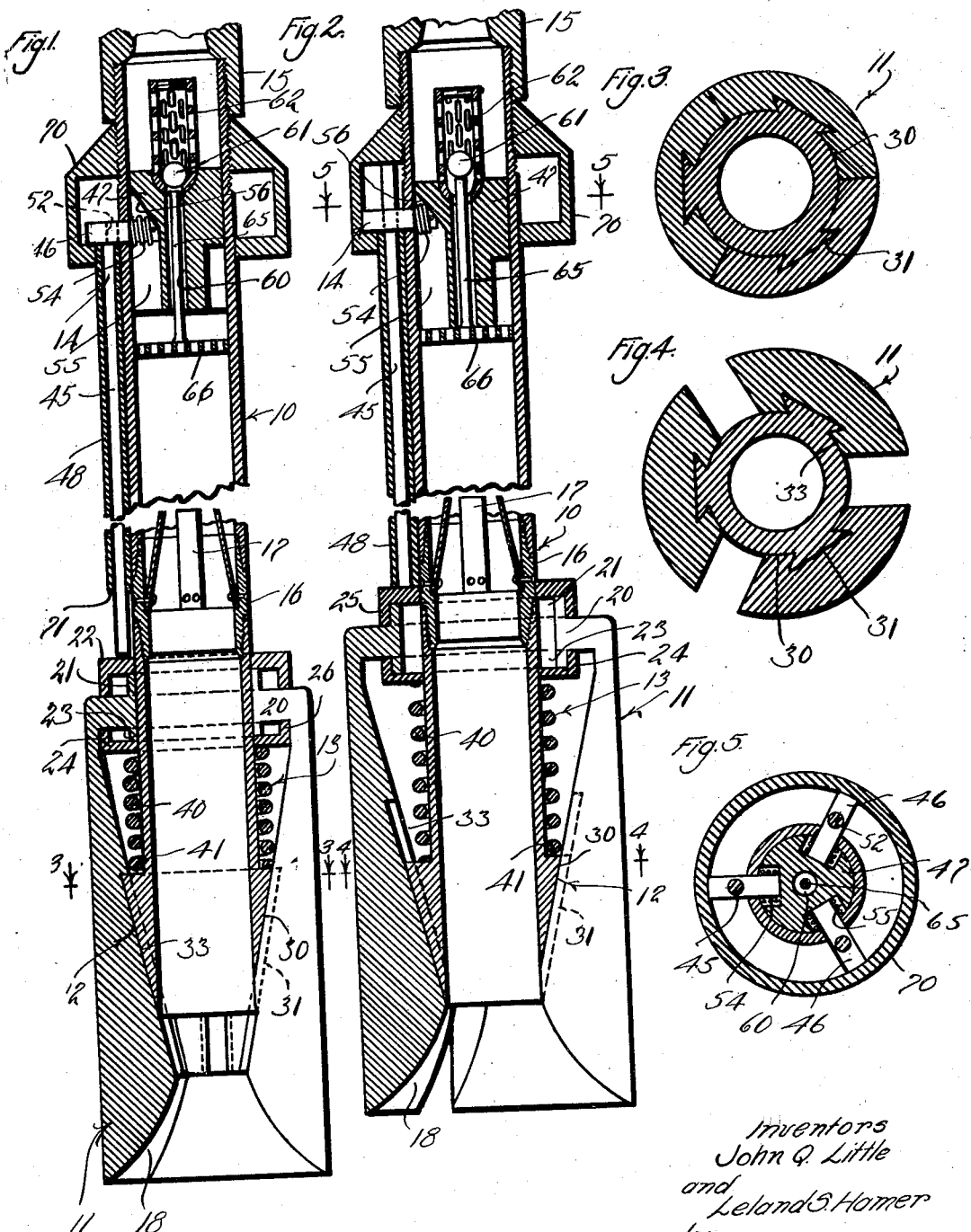

1,780,482

UNITED STATES PATENT OFFICE

LELAND S. HAMER AND JOHN Q. LITTLE, OF LONG BEACH, CALIFORNIA

WELL TOOL

Application filed December 3, 1928. Serial No. 323,447.

This invention has to do with a well tool and relates more particularly to a fishing tool or guide suitable for use with an overshot or other such device, and it is a general object of the invention to provide a guide for use in connection with a fishing tool which can be expanded in the well bore to facilitate directing the fish into the fishing tool and is collapsible so that it can be readily withdrawn from the well bore.

In the drilling of deep wells, for instance oil wells, parts or tools are frequently broken off or lost in the well. The piece, or broken off part left in a well, is termed the "fish" and is ordinarily removed by means of specially designed tools known as fishing tools. One of the most common and frequently used form of fishing tool is the overshot, this being a device designed to be lowered over the fish to engage or grip the fish. There are various forms of overshots and tools of similar character, a most common form being the one in which the overshot has a tubular body part with a plurality of upwardly and inwardly projecting spring fingers to engage over a projection or shoulder of the fish to establish the desired grip or engagement with the fish.

In removing a fish from a well, for instance in removing a length of drill pipe, or the like, broken off in a well, difficulty is often experienced in lowering the fishing tool, for example the overshot, so that it engages over the upper end of the fish. In many cases the upper end of the fish occurs in a portion of the well bore that is fairly large in diameter and the end of the fish is against one wall of the bore so that the fishing tool upon being lowered to engage the fish passes down to one side of it instead of over it.

It is common practice to apply what is known as a bowl, for instance an overshot bowl, at the lower end of a fishing tool, or overshot, for the purpose of guiding or directing the upper end of the fish into the fishing tool. It is desirable to apply an overshot bowl of maximum diameter and in practice this results in the fishing string getting stuck in the hole before it reaches the fish. It is then necessary to remove the fishing string and apply a smaller bowl which may not be effective in guiding the fish into the bowl.

This invention has to do, generally, with a device operable to guide a fish into a fishing tool, say, for instance, into an overshot, and it is a general object of the invention to provide an expansible guide operable to expand or enlarge in the well bore to effectively engage a fish that would otherwise not be engaged by an ordinary guide bowl.

A further object of the invention is to provide a guide device of the character mentioned which will collapse as it is being drawn out of a well so that it will not become stuck in a restricted part of the well through which it may have to pass.

It is a further object of the present invention to provide a guide device of the character mentioned which is under control of the operator so that it can be expanded after being lowered to the desired point in the well.

The present invention provides a device that can be lowered into the well when in collapsed or contracted position and can thereafter be expanded making it possible to operate the tool through a small bore or casing, or restricted part of a bore or casing, and yet expand it to effectively engage a fish.

A further object of the invention is to provide various improved features of construction and arrangement of parts in a device of the general character mentioned.

The various objects and features of the present invention will be best and more fully understood from the following detailed description of a typical form and application of the invention, throughout which description we will refer to the accompanying drawings, in which:

Fig. 1 is a longitudinal detailed sectional view of the device provided by the invention showing it in retracted or collapsed position in which it may be lowered into a well. Fig. 2 is a view similar to Fig. 1 showing the device expanded or in operating position being the position it assumes after it has been tripped for operation. Fig. 3 is a transverse sectional view taken as indicated by line 3—3 on Fig. 1. Fig. 4 is a transverse sectional view taken as indicated by line 4—4 on Fig. 2, and Fig. 5 is a transverse sectional view taken as indicated by line 5—5 on Fig. 2.

The construction provided by the present invention may be applied to or embodied in various fishing tools, the invention being primarily in the nature of a guide for operation with a fishing tool. The invention is particularly applicable to fishing tools such as overshots and therefore we will describe the invention with reference to an overshot it being understood that such reference is not to be considered as limiting the scope or range of application of the invention.

Further, in the drawings and in the following description we disclose a simple and commonly used form of overshot in which the fish engaging parts are in the nature of spring fingers. It is to be understood that the overshot or fishing tool used in connection with the invention may be of any desired type or construction and need not be the ordinary spring finger type of tool herein set forth.

The tool provided by this invention includes, generally, a tubular body 10, an expansible head 11 carried by the body, means 12 for expanding the head, means 13 normally yieldingly urging the head to the expanded position, and means 14 for releasably holding the head in an unactuated or collapsed position. The body 10 is a central longitudinal tubular part forming a mounting or carrier for the various other parts of the tool. In the preferred arrangement the tubular body also carries the fish engaging means or overshot used in combination with the present device. The upper end of the tubular body is adapted to be connected to the lower end of a string of drill pipe, or the like, through a coupling 15 or other suitable means, while the lower end of the body carries the head 11 and the means 12 and 13, as will be hereinafter described. When the overshot or fishing tool is directly carried by the body 10 the body may be formed in sections between which the overshot may be inserted, as illustrated in the drawings. In the drawings I have shown the fishing tool or overshot as comprising a tubular part 16 carried between upper and lower sections of the body 10, and a plurality of spring fingers 17 extending upwardly and inwardly from the part 16 in the manner common to overshots. The tubular part 16, being attached directly in the body 10, forms or becomes a part of the body 10.

The head 11 is an expansible device carried on the lower end of the body 10. The head is designed to function or act as an overshot bowl and therefore has a downwardly facing or opening mouth 18 at or immediately below the lower end of the body 10 designed to guide or direct a fish, or the like, into the body. In the preferred construction the opening or mouth 18 in the lower end of the bowl is an upwardly converging opening proportioned so that it will effectively direct or guide an object into the body.

In accordance with the present invention the bowl is expansible, that is capable of being enlarged or expanded in diameter. In the preferred construction the bowl, which is considered as a whole, is a tubular part longitudinally divided into a plurality of segmental sections as illustrated in the drawings. The lines of division between the sections of the head extend radially with reference to the central axis of the head or of the tool, allowing the sections to be movable radially between positions such as are illustrated in the drawings.

The head is mounted or secured on the body 10 through the means 12 about to be described and also through inwardly extending projections 20 on the upper ends of the wedge head sections. The projections 20 cooperate with one or more rings carried on the body 10. In the case illustrated the projections 20 are provided at their inner ends with upwardly extending flanges 21 cooperating with an upper ring 22, and are provided with corresponding downwardly extending projections 23 cooperating with a lower ring 24. The ring 22 is slidably carried on the body 10 immediately above the flanges 21 and has a downwardly extending peripheral flange 25 which overhangs the flanges 21 to limit outward movement of the head sections. In a similar manner the ring 24 is slidably carried on the body 10 and is provided with an upwardly extending peripheral flange 26 which overhangs the flanges or projections 23 to cooperate with the flanges 23 in limiting outward movement of the head sections.

The means 12 provided for expanding the head is preferably in the form of a wedge means. In the drawings we illustrate the means 12 as including a plurality of upwardly and outwardly extending wedge faces 30 on the exterior of the lower end portion of the body 10 to slidably carry the sections of the head 11. The sections of the head are preferably secured to the wedge faces to have the desired longitudinal movement thereon. For instance, each wedge face 30 may be provided with a longitudinally disposed dovetailed projection 31 fitting a corresponding groove in the wedge section supported on the face. It is to be understood, of course, that each wedge section is formed so that its inner wall or face 33 extends upwardly and outwardly from the mouth opening 18 of the head. The sections of the head therefore cooperate with the wedge faces 30 of the means 12 so that the head is expanded or enlarged in diameter as it is moved upwardly on the means 11, or relative to the body 10, from the collapsed position illustrated in Fig. 1.

The means 13 provided for normally yieldingly urging the head to the expanded position is preferably a spring means, for instance it may include a helical spring 40 surrounding or carried on the body 10 between the lower ring 24 and the shoulder 41 formed where the upper ends of the upwardly and outwardly extending wedge faces 30 terminate. The spring 41 is arranged between these parts so that it is normally under compression and therefore tends to urge the ring 24 upwardly. The ring bears upwardly on the projections 20 of the head sections and therefore tends to move the head sections upwardly on the means 12.

The means 14 for releasably holding the head in an unactuated or collapsed position may be constructed in various ways, it being preferred to provide a construction which can be released by fluid pressure applied to the interior of the body 10 through the string of drill pipe to which the tool is connected. In the form of the invention illustrated the means 14 includes one or more rods 45 for holding the head in the down position with reference to the means 12, a latch 46 in connection with each rod, and a hydraulically operated device 47 for releasing the latches 46. In the arrangement shown we preferably provide a plurality of rods 45 arranged longitudinally at the exterior of the body 10. The rods 45 are shown slidably carried in guideways 48 on the exterior of the body. The guideways and rods extend from the lower end portion of the body to the upper end of the tool or body it being preferred to locate the latches 46 and hydraulically actuated member 47 at a point well above the overshot fingers or fishing tool so that a substantial part of the fish may be allowed to extend into the tool, as is sometimes necessary. The lower ends of the rods 45 cooperate with the ring 22 and when the rods are in the down position they operate to hold the ring 22 where it holds the head sections down. The upper ends of the rods 45 cooperate with the latches 46 which are slidably carried in openings formed through the wall of the body so that the outer end portions of the latches are at the exterior portion of the body and the inner end portions of the latches are at the interior of the body. The outer end portions of the latches 46 operate to hold the rods 45 down when the latches are in the "in" position as shown in Fig. 1, and are provided with openings 52 which register with the rods 45 and slidably pass the rods when the latches are moved to the "out" position as shown in Fig. 2. The openings 52 are formed so that the rods 45 extend upwardly through the latches allowing the rods to move upwardly so that the spring 40 operates the head to the expanded position as shown in Fig. 2.

Springs 54 are provided in connection with latches 46 to normally yieldingly hold them in the positions shown in Fig. 1. The hydraulically actuated part 47 is in the form of a plunger slidably carried in the body 10 at the latches 46 to be moved downwardly in the body by fluid pressure introduced into the upper end of the body. The member 47 has guideways 55 into which the inner end portions of the latches extend, and the guideways have bevelled or upwardly and outwardly inclined bottoms 56 which operate to move the latches 46 outwardly against the resistance of the springs 54 when the member 47 is forced downwardly in the body 10 by fluid pressure from above. It will be obvious from the foregoing description that the invention can be carried out with a single rod 45 and cooperating latch 46. In practice it is desirable to provide a plurality of rods and cooperating latches arranged symmetrically around the central axis of the tool, as shown throughout the drawings.

It is desirable to provide for circulation downwardly through the tool when the tool is being operated to engage a fish or after the fish has been engaged. In the form of the invention illustrated a circulation opening 60 is formed longitudinally through the member 47 and a valve 61 is arranged to normally check downward flow of fluid through the opening 60. The valve 61 operates in a cage 62 projecting upwardly from the member 47, as clearly shown in Figs. 1 and 2 of the drawings. In order that the valve 61 may be opened when the device is operated or in expanded position as shown in Fig. 2, I provide a valve lifting rod 65 in the body 10 to engage under the valve and lift it to the open position, as shown in Fig. 2, when the parts are operated as shown in that figure. The valve lifting rod 65 projects upwardly from a plate 66 mounted in the body 10. The plate is provided with a plurality of openings to pass circulating fluid. The parts are proportioned so that the valve 61 remains seated until the member 47 has moved downwardly to release the rods 45 and is thereafter opened to allow for circulation through the body.

In the prefered form of the invention a housing 70 is provided around the outer end portions of the latches to protect them, and the lower ends 71 of the rod guides 48 are located to act as stops for limiting upward movement of the parts under action of the spring 40.

In operating the tool the parts are set in the position shown in Fig. 1 before the tool is lowered into the well so that the tool will enter the well with the head 11 in the unactuated or collapsed position. This allows the tool to freely enter the well bore and pass through a casing or any restricted part of the bore. When the tool has reached the locality of the fish the member 47 is forced downwardly by fluid pressure introduced into the top of the tool from the drill pipe. The downward movement of the member 47 causes operation of the latches 46 so that the rods 45 are released. When the rods 45 are released the spring 40 operates to move the head 11 upwardly with relation to the means 12 so that the head cooperates with the means so that the wedge sections of the head move outwardly thus expanding the head to a position such as is shown in Fig. 2. With the head thus expanded, the tool is operated to engage the fish so that the fish enters the mouth opening 18 of the head and is directed into the body 10. When the tool has been manipulated so that the fish is engaged by the overshot fingers or other fishing tool provided by the present construction, the tool is withdrawn from the well bore. As the tool is passing upwardly in the well bore, any restriction or obstruction that interferes with the upward passage of the head operates to force the head downwardly with reference to the means 12 so that the head sections are retracted allowing the device to pass such restriction or obstruction. It will thus be apparent that the invention provides a construction which is safe to operate as it will automatically collapse or retract, if necessary, as it is being withdrawn from the well.

Having described only a typical preferred form and application of the invention, we do not wish to limit ourselves to the specific details set forth, but wish to reserve to ourselves any changes or variations that may appear to those skilled in the art or fall within the scope of the following claims:

Having described our invention, we claim:

1. A well tool of the character described including, a body, an expansible head to guide an object into the body, means carried by the body for releasably holding the head in an unexpanded position, and means for yieldingly holding the head in expanded position.

2. A well tool of the character described including, a body, an expansible head to guide an object into the body, hydraulically controlled means for releasably holding the head in an unexpanded position, and means for yieldingly holding the head in expanded position.

3. A well tool of the character described including, a body, an expansible head to guide an object into the body, and means for yieldingly holding the head in expanded position including a spring surrounding the body.

4. A well tool of the character described including, a body, an expansible head carried on the lower end portion of the body to guide an object into the body, and a spring arranged around the body and within the head normally tending to operate the head for expansion.

5. A well tool of the character described including, a body, an expansible head carried on the lower end portion of the body to guide an object into the body, a ring around the body holding the upper portion of the head, and a spring arranged around the body and within the head normally tending to operate the head for expansion.

6. A well tool of the character described including, a body, an expansible head to guide an object into the body, means whereby the head is expanded by movement relative to the body, a spring tending to move the head relative to the body, and means for releasably holding the head against movement relative to the body.

7. A well tool of the character described including a body, an expansible head to guide an object into the body, means whereby the head is expanded by movement of the head longitudinally relative to the body, and a spring tending to move the head relative to the body.

8. A well tool of the character described including a body, an expansible head, wedge means whereby the head is expanded by movement relative to the body, and a spring tending to move the head relative to the body.

9. A well tool of the character described including, a body, an expansible head, means whereby the head is expanded by movement relative to the body, a spring tending to move the head relative to the body, and means for releasably holding the head against movement relative to the body including a latch and hydraulic actuating means for the latch.

10. A well tool of the character described including, a body, an expansible head to guide an object into the body, means whereby the head is expanded by movement relative to the body, a spring tending to move the head relative to the body, and latch means for releasably holding the head against movement relative to the body.

11. A well tool of the character described including, a body, an expansible head, means whereby the head is expanded by movement relative to the body, a spring tending to move the head relative to the body, and means for releasably holding the head against movement relative to the body including a latch and hydraulic actuating means for the latch, the hydraulic means including a member in the body to be actuated by pressure in the body.

12. A well tool of the character described including, a body, an expansible head, means whereby the head is expanded by movement relative to the body, a spring tending to move the head relative to the body, and means for releasably holding the head against movement relative to the body including a latch and hydraulic actuating means for the latch, the hydraulic means including a member in the body to be actuated by pressure in the body, the member having a valve controlled opening automatically opened upon said member being operated.

13. A well tool of the character described including a body, an expansible head, means whereby the head is expanded by movement relative to the body, a spring tending to move the head relative to the body, and means for releasably holding the head against movement relative to the body including a latch and hydraulic actuating means for the latch, the hydraulic means including a member in the upper portion of the body to be actuated by the pressure in the body.

In witness that we claim the foregoing we have hereunto subscribed our names this 8th day of November, 1928.

LELAND S. HAMER.
JOHN Q. LITTLE.